US007001454B2

(12) United States Patent
Lopez-Gonzales et al.

(10) Patent No.: US 7,001,454 B2
(45) Date of Patent: Feb. 21, 2006

(54) CLINKER AND WHITE PORTLAND CEMENT WITH A HIGH SULFUR CONTENT DERIVED FROM A HIGH SULFUR CONTENT PET-COKE USED AS FUEL

(75) Inventors: Waltter Lopez-Gonzales, Monterrey (MX); Carlos Enrique Castillo-Linton, San Nicolas de los Garza (MX); Graciela Eguia-Marquez, Monterrey (MX)

(73) Assignee: Cemex Trademarks Worldwide, Ltd., Brugg (CH)

( * ) Notice: Subject to any disclaimer, the term of this patent is extended or adjusted under 35 U.S.C. 154(b) by 132 days.

(21) Appl. No.: 10/732,631

(22) Filed: Dec. 10, 2003

(65) Prior Publication Data

US 2005/0126444 A1 Jun. 16, 2005

(30) Foreign Application Priority Data

Dec. 10, 2002 (MX) .................... PA/a/2002012235

(51) Int. Cl.
*C04B 7/36* (2006.01)
(52) U.S. Cl. ...................................... 106/739; 106/713
(58) Field of Classification Search ................ 106/739, 106/713
See application file for complete search history.

(56) References Cited

U.S. PATENT DOCUMENTS

| 3,767,435 | A | * | 10/1973 | Mori et al. | |
|---|---|---|---|---|---|
| 4,465,460 | A | | 8/1984 | Cosar | |
| 4,662,945 | A | | 5/1987 | Lawall | |
| 4,715,811 | A | | 12/1987 | Lawall | |
| 4,798,628 | A | * | 1/1989 | Mills et al. | |
| 5,356,472 | A | * | 10/1994 | Odler | 106/734 |
| 5,374,309 | A | * | 12/1994 | Piniecki | 106/714 |
| 5,698,027 | A | | 12/1997 | Borgholm et al. | |
| 5,851,282 | A | * | 12/1998 | Odler | 106/733 |
| 6,142,771 | A | | 11/2000 | Doumet | |
| 6,149,724 | A | * | 11/2000 | Ulibarri et al. | 106/693 |
| 6,599,123 | B1 | | 7/2003 | Ramirez-Tobias et al. | |

FOREIGN PATENT DOCUMENTS

| CA | 2193339 | 12/1997 |
|---|---|---|
| EP | 0 812 811 B1 | 4/2003 |
| MX | PA/A/2001/007229 | 7/2001 |

OTHER PUBLICATIONS

English abstract of Chinese Patent No. 1,180,674 issued to Wang Zinchang et al. on May 6, 1998 entitled "Method for producing high quality cement using pet-coke with a high sulfur content."

English abstract of Spanish Patent No. 542,691, published on Aug. 16, 1986, entitled "Process for obtaining white clinker with a low fuel consumption using fluorite and sulphates as raw meal components."

\* cited by examiner

*Primary Examiner*—Paul Marcantoni
(74) *Attorney, Agent, or Firm*—A. Thomas S. Safford; Frommer Lawrence & Haug LLP

(57) ABSTRACT

The present invention relates to a family of white clinker compositions with a high capacity to fix sulfur derived from a high sulfur content pet-coke used as fuel in the manufacture thereof, which further exhibits low fuel composition and fast setting, achieved by being comprised of the following amounts of clinker phases in percentage by weight: $3CaO.SiO_2$ ($C_3S$): 40 to 75, $2CaO.SiO_2$ ($C_2S$): 10 to 35, $3CaO.Al_2O_3$ ($C_3A$): 0 to 15, $CaO.SO_3$ ($C\bar{S}$): 0 to 10, $4CaO.3Al_2O_3.SO_3$ ($C_4A_3\bar{S}$): 2 to 15, $11CaO.7Al_2O_3.CaF_2$ ($C_{11}A_7.CaF_2$): 0 to 5, total % $CaF_2$: 0.3 to 1.5 measured as $CaF_2$, % $Fe_2O_3$: 0 to 0.5 and a $SO_3$ content between 1.5 to 5% by weight obtained through the calcination of a raw meal containing $CaO$, $SiO_2$, $Al_2O_3$, and $CaF_2$, using as fuel, pet-coke with a sulfur content higher than 5% and at temperatures between 2192 and 2462° F., without the addition of essentially additive containing SO3 in the raw meal.

18 Claims, No Drawings

CLINKER AND WHITE PORTLAND CEMENT WITH A HIGH SULFUR CONTENT DERIVED FROM A HIGH SULFUR CONTENT PET-COKE USED AS FUEL

RELATED APPLICATION (FOREIGN PRIORITY CLAIM)

Benefit is claimed of the prior filing date of Mexican application no. PA/a/2002/012235, filed Dec. 10, 2002 in accordance with 37 CFR §1.55 and 35 USC §119.

FIELD OF THE INVENTION

The present invention is related to a new family of clinker and white portland cement compositions, and more particularly, to a family of white clinker compositions with a high content of sulfur derived mainly from sulfur-containing fuel, and the properties of the cements thus obtained.

BACKGROUND OF THE INVENTION

Portland cement clinker is basically composed of four crystalline stages: alite (tricalcium silicate): $3CaO.SiO_2$ ($C_3S$), belite (dicalcium silicate): $2CaO.SiO_2$ ($C_2S$), tricalcium aluminate: $3CaO.Al_2O_3$ ($C_3A$) and tetracalcium aluminoferrite: $4CaO.Al_2O_3.Fe_2O_3$ ($C_4AF$). The latter is the only one colored; and, therefore, the only one responsible for the characteristic color of the ordinary gray Portland cement.

The ordinary Portland cement is the product from the ground Portland cement clinker and a setting regulator, which traditionally has been gypsum ($CaSO_4.2H_2O$).

Processes and plants used for manufacturing white Portland Cement (P.C.) clinker are widely known in the art. Generally, the manufacturing process for White P.C. clinker differs from that for Gray P.C. clinker in the following basic aspects:

(1) Chemical: To obtain a White P.C. clinker, the total $Fe_2O_3$ content from the raw materials for the White P.C. clinker is controlled and must be less than 0.5% by wt. This implies eliminating the main melting agent (flux) from the gray P.C. clinker. Consequently, the liquid stage is essentially formed only from calcium aluminates, which will crystallize after a cooling process as $C_3A$. This thus eliminates formation of the $C_4AF$ solid solution; which is responsible for the gray P.C. color.

(2) Sintering: Eliminating the main flux found in gray Portland cement clinker, results in white P.C. clinker; which with less flux consequently increases over all the temperature for the liquid stage; from 2440.4° F. (1338° C.) for a gray P.C. clinker to 2642–2678° F. (1450°–1470°) for a white P.C. clinker. This thus requires a higher fuel consumption during sintering as compared to the gray P.C. clinker sintering process.

(3) Cooling: In the manufacturing process of white P.C. clinker, typically the clinker cooling process is more difficult than for the cooling process in the gray P.C. clinker manufacturing process, where one is trying to stabilize most of the iron on a reduced state ($Fe^{2+}$), that is less chromophore than ($Fe^{3+}$).

Despite the differences above-mentioned between both types of Portland cement clinker manufacturing processes, basically the two Portland cement clinkers are generally constituted by the same main mineralogical stages: $C_3S$, $C_2S$, $C_3A$ and, exclusively for Portland cement gray clinker, $C_4AF$.

Advantages of a white P.C. over a gray P.C., are basically their white color, for which it is widely used for exposed structures and texturized elements, which can be white or colored. It is also common that white Portland cement develops better compression strength due to a high content of $C_3A$, as compared to a gray Portland cement. A disadvantage of a white Portland cement is its low resistance to sulfates attack, mainly due to the high content of $C_3A$, that reacts with environmental sulfates and produces ettringite when mortar or concrete is hardened, causing fissures or cracking.

On the other hand, in the state of the art, it is known that sulfur coming from traditionally used fuels for the cement industry, such as gas (non-sulfur containing), carbon (1–2% S), fuel oil (2–4% S) and low sulfur content pet-coke [petroleum coke] (<5% S), is fixed on clinker in the form of anhydrite, $CaOSO_3$ ($C\bar{S}$), and in the presence of alkali leaching it forms alkaline sulfates: $Na_2O.SO_3$ and $K_2O.SO_3$. Said anhydrite and alkaline sulfates fixing on the clinker is a desirable factor since up to now it has represented the only way of extracting sulfur from the interior of the furnace, avoiding blockages and obstructions of the kiln itself, as well as the emission of SOx to the atmosphere.

In this way, sulfur, being semi-volatile, forms a cycle within the furnace, which re-concentrates and once such sulfur reaches a critical $SO_3$ evaporating concentration, that is associated with clustering in the kiln which makes kiln operation difficult and unstable, thereby reducing its production (and can even form blockages serious enough to result in a stoppage of the kiln itself).

On the other hand, fuel-oil cost is inversely proportional to its sulfur content. For this reason, high sulfur content pet-coke (S>5%) represents an opportunity for the cement industry due to its availability at a lower cost.

Unfortunately, the use of such fuel is difficult, since it requires special care for operation New methods have long been needed that could ease use without detriment to the furnace operation continuity. Currently, the use of the pet-coke as fuel, in one hand, generates the necessary heat to maintain the process temperature; and on the other hand, it produces a higher amount of $SO_2$, which can become large enough to produce blockages in the pre-heater and form rings in the rotating kiln. This causes operational troubles, reducing its efficiency and, in more serious cases, actually interrupts operation.

On one hand, and particularly in relation to the Portland cement clinker, in the state of the art there are numerous efforts aimed to facilities, equipment and/or processes design, for the use of solid fuels with a high sulfur content, in order to solve the problems associated with $SO_2$ formation and accumulation. However, most of processes and/or plants that manufacture Portland cement clinker and use a solid fuel with a high sulfur content, present certain disadvantages such as complexity of processes and equipment, as well as high operational costs. Examples of such efforts are disclosed in, for example, the U.S. Pat. No. 4,465,460 entitled "Cement clinker production" issued to Paul Cosar on Aug. 14, 1984; U.S. Pat. Nos. 4,662,945 and 4,715,811 both entitled "Process and apparatus for manufacturing poor cement clinker in sulfur" issued to Thomas R. Lawall on May 5, 1987 and in Dec. 29, 1987 respectively; the U.S. Pat. No., 6,142,771 entitled "Cement clinker production control using high sulfur content fuel within a rotating kiln with a Lelep-Lepol displaceable grid through the sulfur final analysis in the final product", issued to Joseph Doumet on Nov. 7, 2000; Chinese Patent No. 1,180,674 issued to Wang Xinchang et al on May 6, 1998 entitled "Method for producing high quality cement using pet-coke with a high sulfur content".

A recent effort to solve problems associated to the use of high sulfur content coke, is disclosed by Mexican Application No. PA/a/2001/007229 entitled "Method of producing cement clinker using high sulfur content pet-coke" filed on Jul. 13, 2001 by Trademarks Europa, S.A. de C.V., which is a subsidiary of the CEMEX group (see also the corresponding U.S. Pat. No. 6,599,123, issued Jul. 29, 2003). In this latter application is discussed a method to produce cement clinker that allows a more economic and efficient use of fuels with a high sulfur content such as pet-coke and that minimizes problems associated with blockages and incrustations due to the high concentration of $SO_2$ and/or $SO_3$ in the system. In this document is described the production of a high quality cement clinker that does not require addition of additives to improve its final physical properties.

On the other hand, there is another group of scientists and technologists who have focused their efforts on reducing Portland cement clinker sintering temperatures, through chemical modifications (of raw mix or raw meal), and have frequently used non-traditional mineralizers and fluxes. Examples of this group's efforts are generally described in the U.S. Pat. No. 5,698,027 entitled "Method and Plant for manufacturing mineralized Portland cement clinker" granted to F.L. Smidth & Co., which is related to a mineralizer such as gypsum, fluorite, etc., as a control parameter for preventing or reducing problems associated with the rotating kiln operation; the Spanish Patent No. 542,691 "Process for obtaining white clinker with a low fuel consumption using fluorite and sulphates as raw meal components", describes a process for producing a clinker composition which is formed under lower temperatures as compared to traditional temperatures for the Portland clinker manufacturing, forming a new liquid phase called fluorelestadite: $3C_2S.3CaO_4.CaF_2$. However, said cements present some problems with strength development, over all, at early ages (1 and 3 days), even when strength increases at long ages (28 days and more), as compared to strength developed by common Portland cement.

There is a third group of researchers who have found non-Portland clinker cement compositions, based on the formation of a phase rich in sulfur, calcium sulphoaluminate: $4CaO.3Al_2O_3.SO_3$ ($C_4A_3\check{S}$). Said calcium sulphoaluminate based cements exhibit an accelerated development of initial strengths compared to Portland cement, due to the ($C_4A_3\check{S}$) hydration to form ettingite. Examples of this branch of development are U.S. Pat. No. 6,149,724 to Poo Ulibarri et al, granted to CEMEX in 2000, or the corresponding Canadian Patent No. 2,193,339 and European Patent No. 0 812 811.

In 1994, U.S. Pat. No. 5,356,472 "Portland cement clinker and Portland cement", to Ivan Odler, disclosed a method for manufacturing gray clinkers under low forming temperatures, for example between 2102° F.–2462° F. (1150° C.–1350° C.). This clinker was formed by $C_3S$, ($C_4A_3\check{S}$) and preferably also $C_4AF$ phases and practically without $C_2S$ and $C_3A$, if to the raw mix containing CaO, $SiO_2$, $Al_2O_3$, and $Fe_2O_3$ was added an inorganic additive containing $SO_3$ and other inorganic additive containing fluorine. Cement was obtained with strength comparable to that of conventional gray Portland cement, when the cement was prepared with a clinker composition of 80% $C_3S$, 10% $C_4A_3\check{S}$ and 10% $C_4AF$.

However, no prior art document is related to the main objective of the present invention; which is to produce a family of mineralogical compositions of white cement clinkers, formed by $C_3S$, $C_2S$, $C_4A_3\check{S}$, $C_3A$, $C_{11}A_7.CaF_2$, $C\check{S}$ phases, without the presence of $C_4AF$, with a high capacity to fix sulfur derived from pet-coke as a sulfur source [which fixation enables the use of a high sulfur content fuels (>5% S)], using the conventional infrastructure of cement plants, for the production of white portland cements with compression strength similar to or even greater than the strength of conventional white Portland cement.

Therefore, it is an objective of the present invention to provide new clinker and white portland cement compositions with high capacity of fixing sulfur coming from pet-coke with a high sulfur content, used as fuel.

Another objective of the present invention is to provide new clinker and white Portland cement compositions exhibiting low fuel consumption in its manufacturing process and having fast setting developing increased compression initial strengths.

It is further another object of the present invention to provide new clinker and white portland cement compositions using the conventional cement Plants infrastructure.

BRIEF DESCRIPTION OF THE INVENTION

The present invention is related to a new family of white portland cement clinker compositions, with a high capacity to fix sulfur derived from pet-coke having a high sulfur content, used as a fuel in the production thereof, and to the white portland cement thus obtained with such properties. White portland cement clinker of the present invention comprises amounts of clinker phases in percentage by weight, as follows: from 40 to 75% of $C_3S$, from 10 to 35% of $C_2S$, from 0 to 15% of $C_3A$, without $C_4AF$, from 0 to 10% of $C\check{S}$, from 2 to 15% of $C_4A_3\check{S}$, from 0 to 5 of $C_{11}A_7.CaF_2$, % $CaF_2$ total from 0.3 to 1.5 measured as $CaF_2$, % $Fe_2O_3$ from 0 to 0.5%; and a content of $SO_3$ between 1.5 and 5% by weight obtained through a raw meal calcination mainly containing CaO, $SiO_2$, $Al_2O_3$, and $CaF_2$, using pet-coke as fuel with a sulfur content higher than 5%, at temperatures ranging between 2192 and 2462° F. (1200° C. and 1350° C.), without the addition of any additive containing $SO_3$ to the raw meal.

In the broader aspects of this invention, the $SO_3$ content in the clinker is mainly provided by means of the organic fuel with a sulfur % greater than 5%. Specific additional sources of the $SO_3$ content in the clinker are listed below (and in the claims).

DETAILED DESCRIPTION OF PREFERRED EMBODIMENTS OF THE INVENTION

The present invention is related to a new family of white portland cement clinker compositions based on factors such as, for example, alite ($C_3S$) formation temperatures and calcium sulphoaluminate ($C_4A_3\check{S}$) decomposition; the use of high sulfur content organic fuels that provide cement clinker a $SO_3$ content of 1.5 to 5% by weight; and sintering temperature reduction. It is widely known that alite formation temperature for a Portland cement clinker is approximately of 2516° F. (1380° C.), while calcium sulphoaluminate decomposition temperature for a white portland cement clinker is approximately 2462° F. (1350° C.). Taking into account these criteria among others, the inventors have discovered that a new family of white portland cement clinker compositions can be obtained through the use of adequate mineralogical phases ($C_3S$, $C_2S$, $C_3A$, $C\check{S}$, $C_4A_3\check{S}$ and $C_{11}A_7.CaF_2$) of cement clinker and through the reduction of sintering temperature, using a high sulfur content organic source, without having problems associated with the use of said organic source as fuel (for example, high sulfur content pet-coke) which has a sulfur content higher than 5%.

White portland cement, prepared from the above described clinker by fixing sulfur supplied mainly by high sulfur content pet-coke (>5% S), in the form of calcium sulphoaluminate, $C_4A_3\bar{S}$, exhibits an excellent increase in the compression strength. It particularly exhibits an accelerated development of initial strengths, especially during the interval of time from 1 to 3 days.

Specific Reference is Made to the Following Illustrative Embodiments:

Total content of $SO_3$ in cement shall be between 3 and 10% (or preferably between 3.5 and 10%) by weight obtained through the calcination of raw meal containing CaO, $SiO_2$, $Al_2O_3$ and $CaF_2$, using as fuel pet-coke with a sulfur content higher than 5%, without the addition of any additive containing $SO_3$ in the raw meal.

A white Portland cement clinker can include the following amounts from the clinker phases in % by weight:

$3CaO.SiO_2$ ($C_3S$): 40 to 75,
$2CaO.SiO_2$ ($C_2S$): 10 to 35,
$3CaO.Al_2O_3$ ($C_3A$): 0 to 15,
$CaO.SO_3$ ($C\bar{S}$): 0 to 10,
$4CaO.3Al_2O_3.SO_3$ ($C_4A_3\bar{S}$): 2 to 15,
$11CaO.7Al_2O_3.CaF_2$ ($C_{11}A_7.CaF_2$): 0 to 5,
Total % $CaF_2$: 0.3 to 1.5 measured as $CaF_2$,
% $Fe_2O_3$: 0 to 0.5, and a $SO_3$ content between 1.5 and 5% by weight. Clinker is obtained through calcination of a raw meal containing CaO, $SiO_2$, $Al_2O_3$ and $CaF_2$, using as fuel pet-coke with a sulfur content higher than 5% at temperatures between 2192° F. to 2462° F. (1200° C. and 1350° C.) without the addition to the raw meal of any additive containing $SO_3$.

A cement clinker with percentages by weight of the following clinker phases is preferred:

$C_3S$: 40 to 75,
$C_2S$: 10 to 35,
$C\bar{S}$: 0 to 10,
$C_4A_3\bar{S}$: 5 to 15,
$C_{11}A_7.CaF_2$: 2 to 5,
Total % $CaF_2$: 0.3 to 1.5 measured as $CaF_2$,
% $Fe_2O_3$: <0.5, In another embodiment of the present invention, a cement clinker with percentages by weight of the following clinker phases is more preferred:

$C_3S$: 40 to 75,
$C_2S$: 10 to 35,
$C\bar{S}$: 0 to 10,
$C_4A_3\bar{S}$: 5 to 15,
Total % $CaF_2$: 0.3 to 1.5 measured as $CaF_2$,
% $Fe_2O_3$: <0.5, In yet another embodiment of the present invention, a cement clinker with percentages by weight of the following clinker phases is also more preferred:

$C_3S$: 40 to 75,
$C_2S$: 10 to 35,
$C_3A$: 5 to 15,
$C\bar{S}$: 0 to 10,
$C_4A_3\bar{S}$: 2 to 10,
Total % $CaF_2$: 0.3 to 1.5 measured as $CaF_2$,
% $Fe_2O_3$: <0.5

Clinker calcination can be controlled to produce specific amounts of $C_2S$ and $C_3A$ phases, such as the sum of the $C_2S$ and $C_3A$ clinker phases must be higher or equal to 10% by weight. Preferably $C_3A$ clinker phase is absent.

Clinker phase forming is facilitated by means of a $CaF_2$ percentage which is about 0.3 to 1.5 measured as $CaF_2$ in the clinker. The preferred range is between 0.2 and 1.0% measured as $CaF_2$ in the raw meal.

A preferred $SO_3$ content in the clinker can be indicated as 1.5 to 5% by weight, mainly provided by means of the organic fuel such as pet-coke with a sulfur % greater than 5%. However, it is also possible to optionally complement the $SO_3$ content in the clinker with other inorganic sources selected from the group consisting of plaster, anhydrite or industrial debris containing sulfur.

Corresponding calcium sulphate can be used to prepare finished white Portland cement.

To optimize the setting reaction, according to an embodiment, it is suggested that the clinker be ground in a specific area of 465 to 775 $in^2/g$ (3000 to 5000 $cm^2/g$) measured according to the ASTM C-204 standard through Blaine.

Forming a sulfur-rich phase, calcium sulphoaluminate: $4CaO.3Al_2O_3.SO_3$ ($C_4A_3\bar{S}$), shows an accelerated development of initial strength compared to those of Portland cement, due to $C_4A_3\bar{S}$ hydration to form ettingite. Therefore, cements according to the present invention with $C_4A_3\bar{S}$ contents under 15% by weight, do not practically exhibit any expansion, for which, said cement has an initial strength exceeding that of a common Portland cement.

On the other hand, during the clinker calcination of the present invention, less melted phase is formed (which is also due to the low temperature of calcination), which leads to a relatively porous clinker, consequently, the clinker has a better grinding capacity, and grinding costs are reduced to the same specific area. Particularly, another relevant advantage of the clinker herein, is that alite and belite crystals sizes are less than 25 micrometers, which provides better grinding ease than the conventional white Portland cement clinker.

Clinker has a free lime percentage less than 1.5%, this is, it shows a free lime content similar to that of a white Portland cement clinker, but sinters at 392° F. (200° C.) under the traditional white Portland clinker sintering temperature.

The present invention will be better explained in detail based upon several examples. However, following examples are provided only for illustrative purposes and are not intended to limit the scope of the present invention.

Sample 1 describes a cement free of $C_3A$, but comprises 9% by weight of $C_4A_3\bar{S}$ and 4% by weight of $C_{11}A_7.CaF_2$.

Sample 2 describes a cement free of $C_3A$ and $C_{11}A_7.CaF_2$, but comprises 12% by weight of $C_4A_3\bar{S}$.

Sample 3 describes a cement free of $C_{11}A_7.CaF_2$, but comprises 7% by weight of $C_3A$ and 3% by weight of $C_4A_3\bar{S}$.

Percentages of other clinker phases, $SO_3$ content in clinker, selected calcination temperature, as well as the total of $SO_3$ in cement, are shown in the table below, including compression strength values measured after 1, 3, 7, and 28 days.

To illustrate the advantages that can be obtained with cement of the present invention, a conventional Portland cement, calcined at 2642° F. (1450° C.), is also shown as sample 4.

| Sample | C$_3$S | C$_2$S | C$_3$A | C$_4$A$_3$S | C$_{11}$A$_7$.CaF | CS | SO$_3$ in clinker % | Calcination Temperature °F (°C) | SO$_3$ Total % | 1 day | 3 days | 7 days | 28 days |
|---|---|---|---|---|---|---|---|---|---|---|---|---|---|
| 1 | 61 | 24 | 0 | 9 | 4 | 2 | 3 | 2282 (1250) | 6 | 16 | 32 | 44 | 50 |
| 2 | 61 | 24 | 0 | 12 | 0 | 3 | 3 | 2282 (1250) | 6 | 22 | 34 | 51 | 65 |
| 3 | 61 | 24 | 7 | 3 | 0 | 5 | 3 | 2462 (1350) | 4 | 15 | 29 | 43 | 57 |
| 4 | 63 | 23 | 14 | 0 | 0 | 0 | 0.2 | 2642 (1450) | 3 | 20 | 27 | 39 | 52 |

The data shows that sample 2, according to the present invention, exhibits a significant increase in compression strength at all of the indicated aging intervals. Samples 1 and 3, show comparable strengths over time to those developed by sample 4 (which is the reference of white Portland cement and calcined at 2642° F. (1450° C.). In addition, the white portland cement of the present invention has initial setting time of from 10 to 45 minutes, measured according to the ASTM C-191 standard through Vicat.

In a particularly preferred embodiment of the present invention, the white portland cement that comprises clinker of the present invention can be mixed with other materials such as limestone, slag, fly ash and/or other pozzolanic materials.

Even when certain embodiments of the present invention have been illustrated and described, it should be noted that numerous possible modifications of such embodiments can be made and still be within the scope of the present invention in its broader aspects. The present invention, therefore, shall not be considered as limited excepting for what the prior art demands and for the spirit of the claims attached hereto.

What is claimed is:

1. A white portland cement clinker, with the capacity to fix sulfur derived from an organic fuel having a high sulfur content, greater than 5% S, used as a fuel in the calcination of said clinker, said clinker additionally exhibiting reduced fuel consumption during such calcination and useful for producing a fast setting cement, and comprising amounts of clinker phases in percentage by weight, as follows:

$3CaO.SiO_2$ (C$_3$S): 40 to 75,
   $2CaO.SiO_2$ (C$_2$S): 10 to 35,
   $3CaO.Al_2O_3$ (C$_3$A): 0 to 15,
   $CaO.SO_3$ (CŠ): 0 to 10,
   $4CaO.3Al_2O_3.SO_3$ (C$_4$A$_3$Š): 2 to 15,
   $11CaO.7Al_2O_3.CaF_2$ (C$_{11}$A$_7$.CaF$_2$): 0 to 5,
   Total % CaF$_2$: 0.3 to 1.5 measured as CaF$_2$,
   % Fe$_2$O$_3$: 0 to 0.5, and a SO$_3$ content between 1.5 and 5% by weight obtained through the calcination of a raw meal comprising CaO, SiO$_2$, Al$_2$O$_3$ and CaF$_2$, and using an organic fuel with a sulfur content higher than 5% as the main source of the clinker's SO$_3$ content, at temperatures between 2192° F. and 2462° F. without the addition of any SO$_3$-containing additive to the raw meal as a main source of SO$_3$ content in the clinker.

2. The white portland cement clinker according to claim 1, wherein said clinker comprises the amounts of clinker phases in percentage by weight, as follows:

C$_3$S: 40 to 75,
   C$_2$S: 10 to 35,
   CŠ: 0 to 10,
   C$_4$A$_3$Š: 5 to 15,
   C$_{11}$A$_7$.CaF$_2$: 2 to 5,
   Total % CaF$_2$: 0.3 to 1.5 measured as CaF$_2$,
   % Fe$_2$O$_3$: <0.5, and a SO$_3$ content between 1.5 and 5% by weight obtained through the calcination of a raw meal mainly containing CaO, SiO$_2$, Al$_2$O$_3$ and CaF$_2$, using as fuel pet-coke with a sulfur content higher than 5%, at a temperature about 2282° F., without any SO$_3$-containing additive to the raw meal as a main source of SO$_3$ content in the clinker, wherein the absence of C$_3$A results in a clinker useful in the manufacture of cements resistant to sulfates.

3. The white portland cement clinker according to claim 1, wherein said clinker comprises the amounts of clinker phases in percentage by weight, as follows:

C$_3$S: 40 to 75,
   C$_2$S: 10 to 35,
   CŠ: 0 to 10,
   C$_4$A$_3$Š: 5 to 15,
   Total % CaF$_2$: 0.3 to 1.5 measured as CaF$_2$,
   % Fe$_2$O$_3$: <0.5, and a SO$_3$ content between 1.5 and 5% by weight obtained through the calcination of a raw meal mainly containing CaO, SiO$_2$, Al$_2$O$_3$ and CaF$_2$, using as fuel pet-coke with a sulfur content higher than 5% as the main source of the clinker's SO$_3$ content, at a temperature about 2282° F. without any SO$_3$-containing additive to the raw meal, wherein the absence of C$_3$A results in a clinker useful in the manufacture of cements resistant to sulfates.

4. The white portland cement clinker according to claim 1, wherein said clinker comprises the amounts of clinker phases in percentage by weight, as follows:

C$_3$S: 40 to 75,
   C$_2$S: 10 to 35,
   C$_3$A: 5 to 15,
   CŠ: 0 to 10,
   C$_4$A$_3$Š: 2 to 10,
   Total % CaF$_2$: 0.3 to 1.5 measured as CaF$_2$,
   % Fe$_2$O$_3$: <0.5 and a SO$_3$ content between 1.5 and 5% by weight obtained through the calcination of a raw meal mainly containing CaO, SiO$_2$, Al$_2$O$_3$ and CaF$_2$, using as fuel pet-coke with a sulfur content higher than 5% as the main source of the clinker's SO$_3$ content, at a temperature about 2462° F., without any SO$_3$-containing additive to the raw meal.

5. The white portland cement clinker according to claim 1, wherein the SO$_3$ content of the cement clinker is derived from pet-coke with a sulfur percentage higher than 5%.

6. The white portland cement comprising the cement clinker according to claim 1, mixed with at least one of other materials selected from the group consisting of lime, slag, fly ash and other pozzolanic materials.

7. The white portland cement clinker according to claim 1, wherein the organic fuel is pet-coke.

8. A method of producing a white Portland cement clinker according to claim 7, comprising:
  subjecting a raw meal comprising CaO, $SiO_2$, $Al_2O_3$ and $CaF_2$, to a calcination at temperatures between 2192° F., and 2462° F.;
  using pet-coke having a high sulfur content greater than 5% S as the calcination fuel and as the main source of the clinker's $SO_3$ content;
  said raw meal having been mixed so as to form upon calcination a white Portland cement clinker having phases in percentage by weight, as follows:
  $3CaO.SiO_2$ ($C_3S$): 40 to 75,
  $2CaO.SiO_2$ ($C_2S$): 10 to 35,
  $3CaO.Al_2O_3$ ($C_3A$): 0 to 15,
  $CaO.SO_3$ ($C\check{S}$): 0 to 10,
  $4CaO.3Al_2O_3.SO_3$ ($C_4A_3\check{S}$): 2 to 15,
  $11CaO.7Al_2O_3.CaF_2$ ($C_{11}A_7.CaF_2$): 0 to 5,
  Total % $CaF_2$: 0.3 to 1.5 measured as $CaF_2$,
  % $Fe_2O_3$: 0 to 0.5,
and a $SO_3$ content between 1.5 and 5% by weight, without the addition of any $SO_3$-containing additive to the raw meal as a main source of $SO_3$ content in the clinker.

9. The white Portland cement clinker according to claim 7, wherein the addition of the amounts of $C_2S$ and $C_3A$ clinker phases is higher than or equal to 10% by weight.

10. The white Portland cement clinker according to claim 7, wherein the total $CAF_2$ percentage amount in the raw meal is from 0.2 to 1.0% by weight measured as $CaF_2$.

11. The white Portland cement clinker, according to claim 7, wherein the clinker $SO_3$ content is supplemented with other inorganic sources selected from the group consisting of plaster, anhydrite, and the industrial debris containing sulfur.

12. The white Portland cement clinker according to claim 7, wherein the alite, $C_3S$, and belite, $C_2S$, are crystals with sizes smaller than 25 micrometers, which provides a better ease of grinding than the conventional white Portland cement clinker.

13. The white Portland cement clinker according to any of claims 2 to 4 and 7, wherein said clinker has a free lime percentage less than 1.5%.

14. A white Portland cement comprising the cement clinker according to claim 7, wherein the $SO_3$ content of said cement is between 3.0 and 10%.

15. The white Portland cement according to claim 14, wherein the specific area is 465 to 775 $in^2/g$ measured according to the ASTM C-204 standard through Blaine.

16. The white Portland cement according to claim 14, wherein the initial setting time is between 10 and 45 minutes measured according to the ASTM C-191 standard through Vicat.

17. The white Portland cement according to claim 14, wherein the resistance to compression measured according to ASTM C-109 is about 15 to 25 $N/mm^2$ at 1 day, 25 to 35 $N/mm^2$ at 3 days, 40 to 44 $N/mm^2$ at 7 days, and 50 to 70 $N/mm^2$ at 28 days.

18. The white Portland cement according to claim 14, wherein the $SO_3$ content of the cement is 3.5 to 10 wt. %.

* * * * *